US010520125B2

(12) United States Patent
Halim et al.

(10) Patent No.: US 10,520,125 B2
(45) Date of Patent: Dec. 31, 2019

(54) UNIVERSAL THREAD PROTECTOR

(71) Applicant: UNIARMOUR LLC, Houston, TX (US)

(72) Inventors: Hazem Abdel Halim, Houston, TX (US); Alessandro Caccialupi, Houston, TX (US)

(73) Assignee: UNIARMOUR LLC, Houston, TX (US)

( * ) Notice: Subject to any disclaimer, the term of this patent is extended or adjusted under 35 U.S.C. 154(b) by 115 days.

(21) Appl. No.: 15/807,104

(22) Filed: Nov. 8, 2017

(65) Prior Publication Data

US 2018/0135792 A1 May 17, 2018

Related U.S. Application Data

(60) Provisional application No. 62/420,915, filed on Nov. 11, 2016.

(51) Int. Cl.
*F16L 57/00* (2006.01)
*F16L 55/115* (2006.01)
*B65D 59/06* (2006.01)
*E21B 17/042* (2006.01)

(52) U.S. Cl.
CPC ............ *F16L 57/005* (2013.01); *B65D 59/06* (2013.01); *E21B 17/042* (2013.01); *F16L 55/115* (2013.01)

(58) Field of Classification Search
CPC ........ F16L 57/005; F16L 55/115; B65D 59/06
USPC ........................................ 138/89, 96 R, 96 T
See application file for complete search history.

(56) References Cited

U.S. PATENT DOCUMENTS

| 1,692,710 A | | 11/1928 | Spahn | |
|---|---|---|---|---|
| 1,928,821 A | * | 10/1933 | Santiago | E21B 33/04 126/314 |
| 2,197,450 A | * | 4/1940 | Curtis | F16L 21/045 277/621 |
| 2,612,286 A | * | 9/1952 | Stufft | F16J 13/02 138/89 |
| 3,334,662 A | * | 8/1967 | Wesolowski | F16J 13/10 138/89 |
| 3,599,825 A | * | 8/1971 | Jorgensen | F16J 12/00 220/327 |
| 3,638,969 A | * | 2/1972 | Serrano | F16L 37/05 285/18 |
| 3,748,702 A | * | 7/1973 | Brown | E21B 19/10 188/67 |

(Continued)

*Primary Examiner* — James F Hook
(74) *Attorney, Agent, or Firm* — Egbert Law Offices, PLLC

(57) ABSTRACT

A universal thread protector is provided for protecting either of the pin and box ends of a pipe. The thread protector has a cap with an open end the closed end. A seal element is positioned within and adjacent to the open end of the cap. A ring member is positioned against the seal element between the seal element and the closed end of the cap. Bolts are provided having an end positioned against the ring member. The bolts are movable from an unactuated position to an actuated position wherein the bolt applies a force against the ring member when in the actuated position. As such, the ring member pushes against the seal element so as to deform or compress the seal element against the outer diameter of the pipe positioned within the cap. A method of protecting the threaded ends of pipe is also disclosed.

16 Claims, 6 Drawing Sheets

(56) References Cited

U.S. PATENT DOCUMENTS

| | | | | |
|---|---|---|---|---|
| 3,963,054 | A * | 6/1976 | Martin | E03B 5/06 |
| | | | | 138/89 |
| 4,415,005 | A * | 11/1983 | Janzen | E21B 17/006 |
| | | | | 138/89 |
| 4,616,679 | A * | 10/1986 | Benton | F16L 57/005 |
| | | | | 138/96 R |
| 5,230,737 | A | 7/1993 | Takada et al. | |
| 5,524,672 | A | 6/1996 | Mosing et al. | |
| 6,332,478 | B1 | 12/2001 | Holden et al. | |
| 6,568,430 | B1 | 5/2003 | Shafer | |
| 6,935,380 | B2 | 8/2005 | Rahimzadeh et al. | |
| 7,278,450 | B1 | 10/2007 | Condon | |
| 8,186,723 | B2 | 5/2012 | Kim | |
| 8,881,772 | B2 | 11/2014 | Lubbers | |
| 2005/0081933 | A1 * | 4/2005 | Latiolais, Jr. | B65D 59/00 |
| | | | | 138/96 T |
| 2010/0037977 | A1 | 2/2010 | Rahimzadeh et al. | |
| 2010/0206416 | A1 * | 8/2010 | Carson | F16L 55/11 |
| | | | | 138/89 |

\* cited by examiner

UNIVERSAL THREAD PROTECTOR

CROSS-REFERENCE TO RELATED APPLICATIONS

The present application claims priority from U.S. Provisional Patent Application Ser. No. 62/420,915, filed on Nov. 11, 2016.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of thread protectors for pipes. More particularly, the present invention relates to a universal thread protector for pipes which can be used on both the pin and box ends of the pipe, regardless of thread form.

2. Description of Related Art Including Information Disclosed Under 37 CFR 1.97 and 37 CFR 1.98

Pipes, such as pipes used for oil and gas drilling and production, are often produced in sections and are axially connected end-to-end. Typically, the connection involves the use of a male, externally-threaded portion at one end of one pipe section that is threadingly engageable with a mating female, internally-threaded portion at the end of an axially adjacent pipe section. The male, externally-threaded end of a pipe is often referred to as the pin end, and the female, internally-threaded end of a pipe is often referred to as the box end.

The ends of the pipe, including the threads, are subject to damage when not in actual use, such as from corrosion, impacts with other objects, or from being dropped during transportation or storage. Such damage may render the pipe faulty or unusable, resulting in delay, hardship and increased expense. Devices known as thread protectors are commonly used to protect the ends of pipes, and in particular, to protect the internal and external threads on the ends of pipes from such damage. A pin end thread protector is connected to and protects the pin end of the pipe and associated external threads, and a box end thread protector is connected to and protects the box end of the pipe and associated internal threads. The thread protectors are designed to prevent damage to the respective pipe ends when the pipe impacts other objects, the ground or otherwise is subjected to external impacts. In addition, the thread protectors are designed to seal the ends of the pipe to reduce the potential for premature corrosion of the pipe and/or threads.

Pipes used for oil and gas drilling and production can vary in nominal diameter from two inches to over thirty inches. Further, many pipe manufacturing companies and exploration and production (E&P) companies have developed proprietary thread forms dictating thread geometry (e.g., square threads, trapezoidal threads), thread size (e.g., thread height), and thread pitch (e.g., the number of threads per inch). In addition, the American Petroleum Institute (API) has several thread form standards. As a result, there are over 3,000 different combinations of pipe diameters and thread forms (i.e., thread geometries and thread pitches).

To protect both the pin end and box end of a pipe section, conventional thread protectors typically come in two types: a pin end thread protector that is disposed about the pin end of the pipe and includes internal threads that engage the external threads on the pin end, and a box end thread protector that is positioned in the box end of the pipe and includes external threads that engage the internal threads on the box end. The pin end thread protector is sized, configured, and designed such that its internal threads mate with the external threads of the pin end; and the box end thread protector is sized, configured, and designed such that its external threads mate with the internal threads of the box end. In other words, the internal threads of the pin end protector fit between the external threads of the pin end as the pin end protector is threaded onto the pin end, and the external threads of the box end protector fit between the internal threads of the box end as the box end protector is threaded onto the box end.

As previously described, there are over 3,000 different combinations of pipe diameter and thread form. Accordingly, there are hundreds of different thread protectors, each sized, configured, and designed to mate with the particular combination of pipe diameter and pipe thread form. Significant time and expense are associated with the manufacture of such a large number of different thread protectors, as well as the storage of such a large number of different thread protectors.

FIG. 1 shows the pair of standard thread protectors 10 as used in the prior art. FIG. 1 shows a thread protector 12 for the box end of a pipe, and a thread protector 14 for the pin end of a pipe. The thread protector 12 for the box end of the pipe includes an external thread 16 and an end 18 which extends outwardly of the pipe. The end 18 typically has a means for affixing or screwing the thread protector 12 into the box end of the pipe.

FIG. 1 also shows the thread protector 14 for the pin end of the pipe. The thread protector 14 has an internal thread 20 for receipt of the pin end of the pipe. End 22 of the thread protector 14 extends outwardly from the pin end of the pipe, and similarly has a means for affixing the thread protector 14 to the pipe. Affixing and removing such thread protectors from pipe is very time-consuming. As can be appreciated, many different models of such standard thread protectors would be necessary due to the great number of pipe sizes and different thread forms currently in use.

Various patents have issued and been applied for in the past relating to end caps or thread protectors for pipes. For example, U.S. Patent Publication No. 2010/0037977, published on Feb. 18, 2010 to Rahimzadeh et al., describes a universal pipe cap. The universal pipe cap includes a fluid impervious base and an adjustable sleeve extending from the base and configured to couple to a plurality of pipe ends that vary in size. A securement mechanism selectively sealingly engages the adjustable sleeve to one of a plurality pipe ends so that the adjustable sleeve and the fluid impervious base are able to cooperate with one another to cap the pipe end.

The adjustable sleeve is made from a flexible material and may attach to pipe ends that are either larger in diameter or smaller in diameter than the inside diameter of the adjustable sleeve.

U.S. Pat. No. 6,935,380, also to Rahimzadeh et al. describes a reversible dual-size plumbing end cap. The plumbing end cap has either a first outer diameter or a second outer diameter includes a fluid impervious base for overlying the end of the selected pipe. The end cap also includes an endless wall fixed to a perimeter of the base and configured to seal the end of the selected pipe. The endless wall is pivotable between a first configuration to fit the first outer diameter and a second configuration to fit the second outer diameter.

U.S. Pat. No. 6,568,430, issued on May 27, 2003 to Shafer, describes a quick release pipe band. The quick release mechanism has a band with slots thereon which is enclosed by a latching mechanism. Cams on the end of the locking lever engage with slots in the band and tighten the band about the cap. The pipe end cap of the Shafer patent is intended for use in closing one end of the pipe for transporting materials to job sites using a large pipe as a storage container.

U.S. Pat. No. 6,332,478, issued on Dec. 25, 2001 to Holden et al., describes a reusable pipe flange cover. The molded, flexible pipe flange cover for temporarily covering a pipe flange and a pipe opening includes a substantially round center portion having a peripheral skirt portion extending from the center portion, the center portion adapted to engage a front side of the pipe flange and to seal the pipe opening. The peripheral skirt portion is formed to include a plurality of circumferentially spaced tabs, wherein free ends of the flexible tabs are formed with respective through passages adapted to receive a drawstring for pulling the tabs together on a back side of the pipe flange.

U.S. Pat. No. 5,524,672, issued on Jun. 11, 1996 to Mosing et al., describes a casing thread protector. The thread protector has a toroidal body of elastomer with a bore to accept a pipe end and a metal band and clamp arrangement extending around its periphery. The body is cut through one side to allow the body to expand peripherally. The bore accepts the end of a pipe with threads to be protected when the periphery is expanded and grips the pipe with the bore when the clamp closes the cut and shrinks the bore. To increase unit loading to force more elastomer of the body into thread grooves the bore has projections for gripping pads, or is recessed radially to produce gripping pads. The pads, which may be replaceably attached, reduced area increases deformity under clamping pressure and increases the force required to dislodge the protector from threads. The metal band is removable from an open peripheral groove or an optional arcuate tunnel partially encircling the pad body.

It is object of the present invention to provide a universal thread protector which fits both the pin and box ends of a particular pipe.

It is another object the present invention to provide a universal thread structure which does not utilize casing or tubing threads as the main anchoring means.

It is another object of the present invention to provide a universal thread protector which fits securely over the thread of the threaded end of the pipe.

It is yet another object of the present invention to provide a universal protector which does not require screwing or unscrewing from the pipe, and which is quickly released.

These and other objects and advantages of the present invention will become apparent from a reading of the attached specification and appended claims.

These and other objects and advantages of the present invention will become apparent from a reading of the attached specification and appended claims.

BRIEF SUMMARY OF THE INVENTION

One embodiment of the present invention is a thread protector having a cap with an open end and a closed end, a seal element positioned within and adjacent to the open end of the cap, a ring member positioned against the seal element between said seal element and the closed end of the cap; and at least one bolt having an end positioned against the ring member, the at least one bolt being movable from an unactuated position to an actuated position, the at least one bolt applying a force against the ring member when in the actuated position such that the ring member pushes against the seal element. The seal element may be deformed when the at least one bolt is in the actuated position.

In the present invention, the at least one bolt may have a bolt head extending outwardly of the closed end of the cap, the at least one bolt being threadedly received in a passageway in the cap. The at least one bolt is preferably three radially disposed bolts. The cap may have recessed areas on an outside thereof, the recessed areas formed between the three radially disposed bolts.

In the present invention, the ring member may be a plastic C-ring or a wedge. The seal element is preferably a rubber element.

In an embodiment of the present invention, the cap has an actuating taper formed adjacent the open end, the seal element being positioned between the actuating taper and the ring member.

An embodiment of the present invention is a universal thread protector for a pipe having a pin end and a box end. The universal thread protector having a cap having an open end and a closed end, the open end having an interior adapted to accommodate either of the pin end or the box end of the pipe, an actuating taper formed in the interior of the cap, a seal element positioned against the actuating taper, and at least one bolt received in the cap, the at least one bolt having a first end extending outwardly of the closed end of the cap and a second end located adjacent to the seal element, the at least one bolt movable so as to apply a force to the seal element so as to cause a deformation of the seal element between the cap and the pipe.

In the present invention the at least one bolt may be threadedly received in the cap, the first end of the at least one bolt having a bolt head thereon. The at least one bolt is preferably three radially disposed bolts. The cap may have recessed areas on an outside thereof, the recessed areas formed between the three radially disposed bolts. The closed end of the cap may have raised portions along a perimeter thereof, the bolt heads of the three radially disposed bolts being positioned between the raised portions.

The present invention also includes a method of protecting the threaded end of a pipe comprising the steps of: inserting the threaded end of the pipe into a cap having an open end and a closed end; positioning the threaded end of the pipe against the closed end of the cap such that a threaded portion of the threaded end of the pipe is entirely within the cap; deforming a rubber seal element positioned interior of the cap so as to create a seal between the cap and the threaded end of the pipe. In the present invention, the step of deforming may be moving a bolt from an unactuated position to an actuated position, the bolt applying a force against the rubber seal element when in the actuated position. A ring member may be positioned between the bolt and the rubber seal element.

The foregoing Section is intended to describe, in generality, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
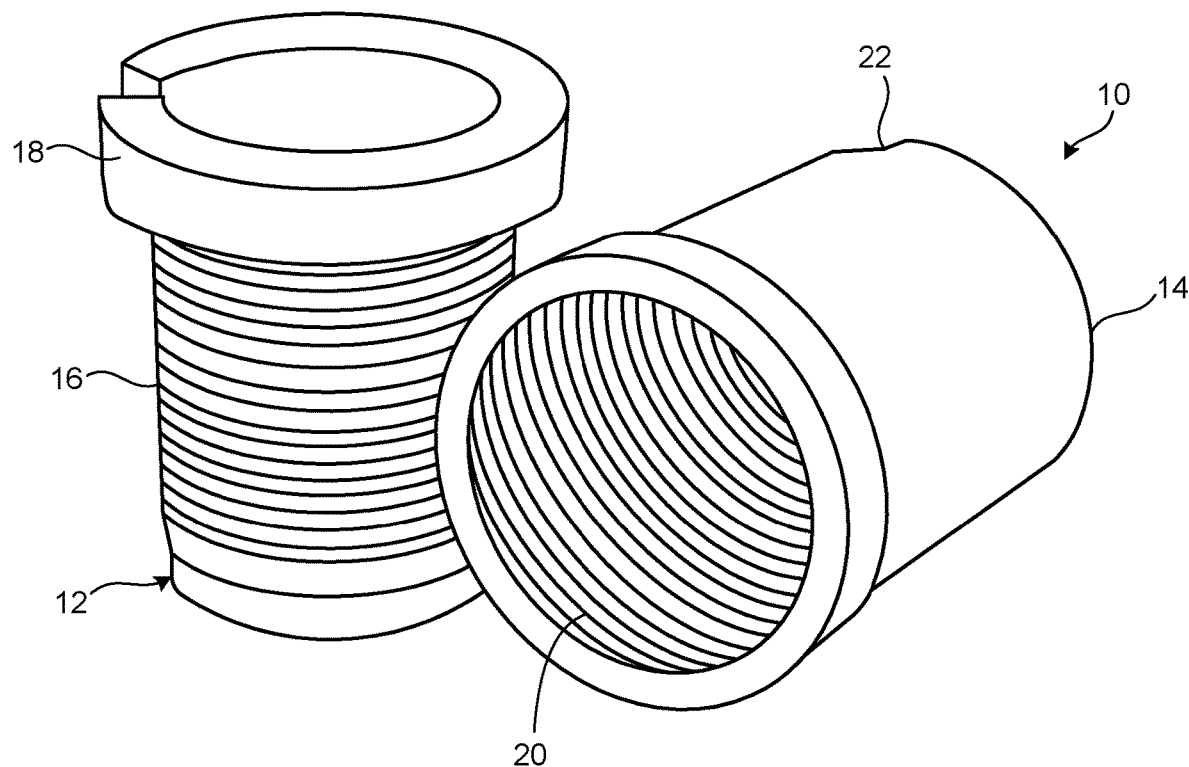
FIG. 1 shows a pair of standard thread protectors as used in the prior art.
Figure 2:
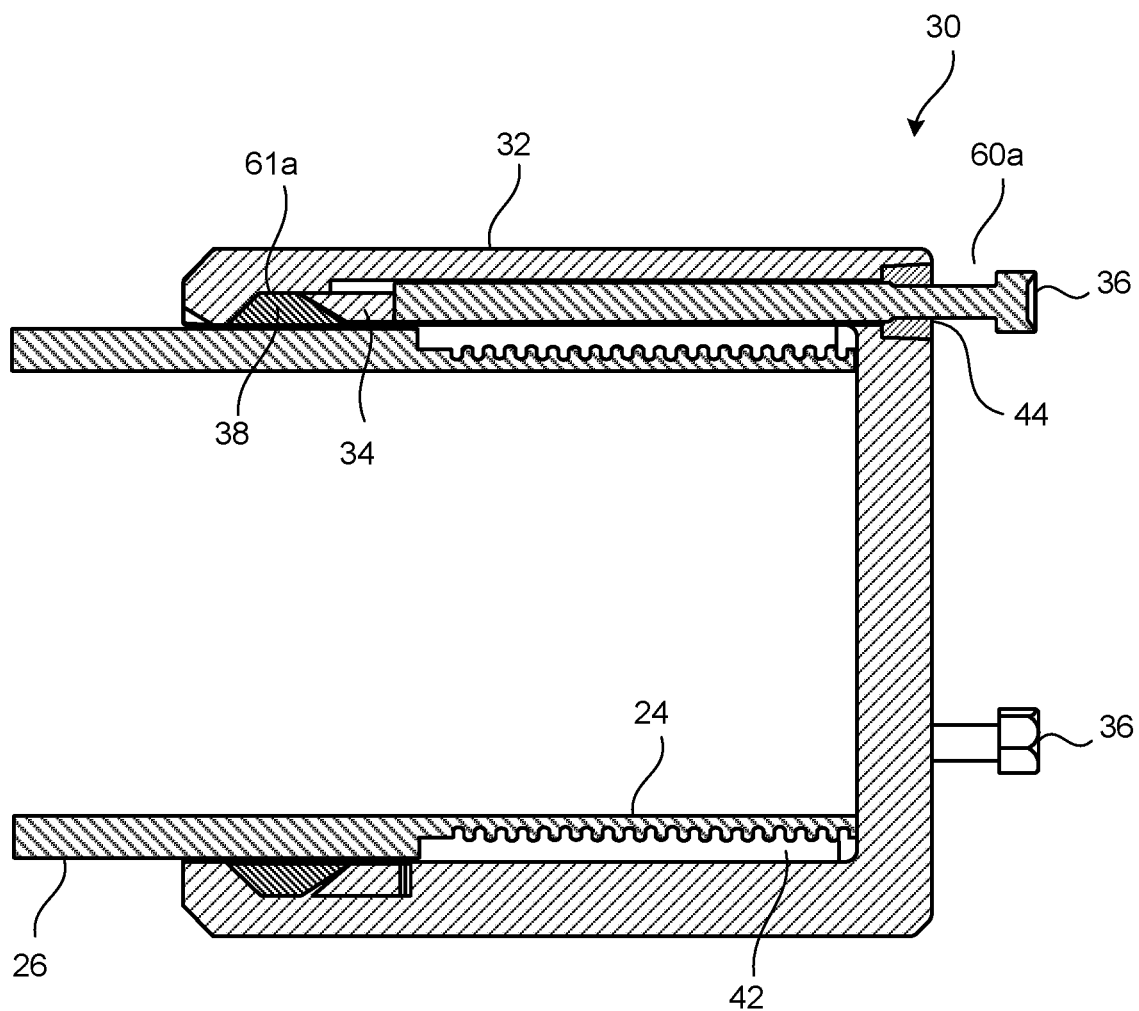
FIG. 2 shows a cross-sectional view of a universal thread protector of an embodiment of the present invention in the unset position.

Referring to FIG. 2, there is shown a cross-sectional view of the universal thread protector 30 of an embodiment of the present invention in the unset position. The universal thread protector 30 has a cap 32 and a seal 38 which is positioned inside of the cap 32 and is encapsulated by the wedge 34. Wedge 34 is of C-ring design so as to be able to assemble into cap 32. The seal 38 is shown as being positioned around the pipe 26 inserted into the universal thread protector 30. The pipe 26 is shown as having a pin end 24. As will be explained below, the universal thread protector can also receive the box end of the pipe 26.

Radially disposed bolts 36 are shown screwed into cap 32 and abutting wedge 34. The bolts 36 stick out a distance 60*a* from cap 32. The bolts 36 can be directly screwed into the cap 32 or into nuts 44 fitted into the cap 32. Further screwing the bolts 36 into the cap 32 pushes the wedge 34 so as to compress the seal 38 thus securing the universal thread protector 30 to the pipe. The seal 38 shows a distance 61*a* in the unset position.

As can be seen in FIG. 2, the universal thread protector 30 does not have threads on the inside thereof. The pin end 24 of the pipe 26 merely abuts a surface of the cap 32 and rests against the seal element 38. FIG. 2 shows how there is a space 42 formed between the pin end 24 of the pipe 26 and the cap 32. In the case where the box end of the pipe 26 is inserted into the universal thread protector 30, the space 42 would be filled by the box end.

Figure 3:
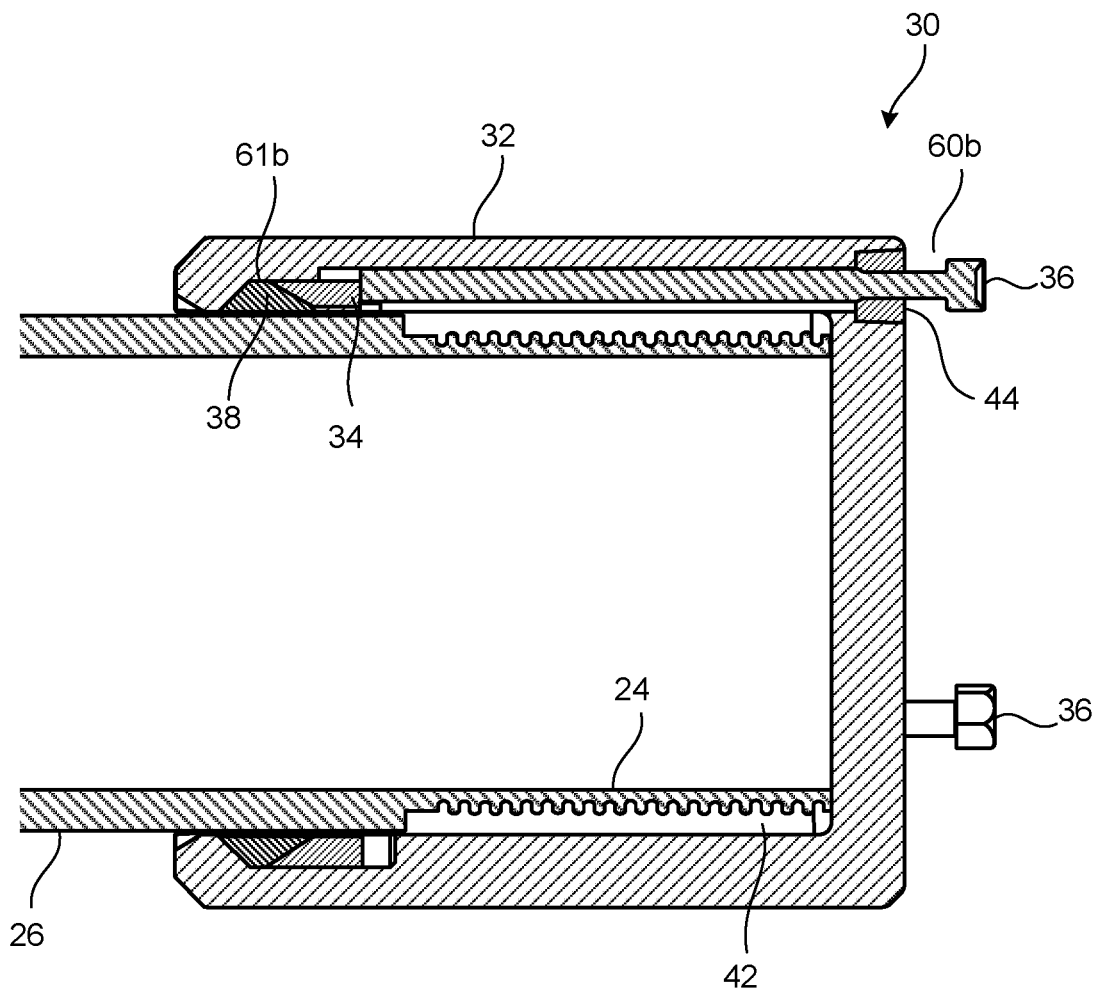
FIG. 3 shows a cross-sectional view of a universal thread protector of an embodiment of the present invention in the set position.

In FIG. 3 there is shown a cross-sectional view of the universal thread protector 30 of the preferred embodiment of the present invention in the set position. In this set position, screwing the bolts 36 creates a longitudinal travel in the wedge 34 and compression on the seal 38. The distance that bolts 36 stick out has decreased to 60*b* and the longitudinal distance of the seal has decreased to 61*b*. This decreased distance 61*b* is what causes the seal 38 to deform and clamp around the outside diameter of the pipe 26.

Figure 4:
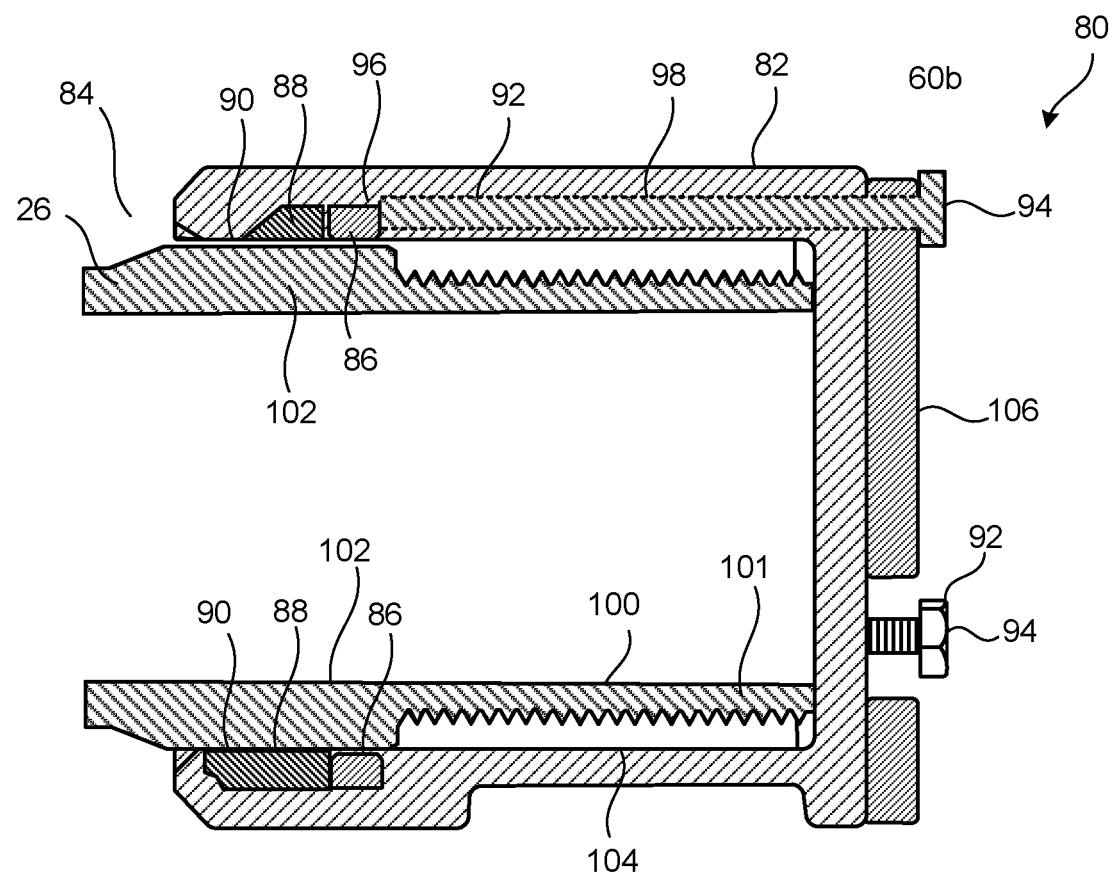
FIG. 4 shows a cross-sectional view of the universal thread protector of the preferred embodiment of the present invention.

Referring to FIG. 4, there is shown a cross-sectional view of the universal thread protector 80 of the preferred embodiment of the present invention. The universal thread protector 80 the preferred embodiment present invention is similar to the previously-disclosed embodiment and has a cap 82. A pipe 26 is shown as extending into the open end 84 of the thread protector 80.

FIG. 4 shows how there is a C-ring or ring member 86 abutting an adjacent rubber element 88. Both the ring member 86 and the rubber element 88 preferably have a rectangular cross-section. These elements take the place of the wedge as shown in FIGS. 2 and 3 of the previous embodiment. The ring member 86 of the preferred embodiment of the present invention is utilized so as to evenly distribute force to the rubber element 88. Preferably, the ring member 86 is a C-ring constructed of a hard plastic material.

The rubber element 88 is shown as abutting a lip or actuating taper 90. Preferably, the actuating taper 90 is angled relative to the longitudinal axis of the thread protector 80. However, the actuating taper 90 could be boxed.

As with the previously-disclosed embodiment, the universal thread protector 80 the preferred embodiment of the present invention has a plurality of bolts 92 received by the cap 82. Each of the plurality of bolts 92 has a bolt head 94 opposite a distal end 96 of the bolt 92. The bolt head 94 is turned by the user, using hand tools or power tools, so as to move the bolts 92 from an unactuated or unset position to an actuated or set position wherein the distal end 96 of the bolt 92 pushes against the ring member 86 and thus, the rubber element 88.

FIG. 4 also illustrates a plurality of passageways 98 suitable for receipt of the various bolts 92. The passageways 98 may be threaded or partially-threaded so as to guide the bolts 92 therein.

FIG. 4 shows the pin end 100 of the pipe 26 being received by the universal thread protector 80. However, due to the universal nature of the present invention, the box end of the pipe 26 may alternately be received in the same space. In FIG. 4, it can be seen how there is a space 104 formed between the inner wall of the cap 82 and the threaded portion of the pin end 100 of the pipe 26. In the event that the box end of the pipe 26 is inserted this the cap, the space 104 would be filled by the outer wall of the pipe 26.

Importantly, FIG. 4 also shows how the threaded portion 101 of the pipe 26 abuts the closed end 106 of the thread protector 80. The universal thread protector 80 is preferably sized such that the unthreaded, thicker portion 102 is also positioned within the thread protector 80. As such, it can be seen how the rubber element, when deformed or moved by the ring member 86, abuts this thicker, unthreaded portion 102 of the pipe 26. As such, contact of the rubber element 88 with the threaded portion 101 of the pipe is avoided, thus creating a stronger connection between the universal thread protector 80 and the pipe 26.

Figure 5:
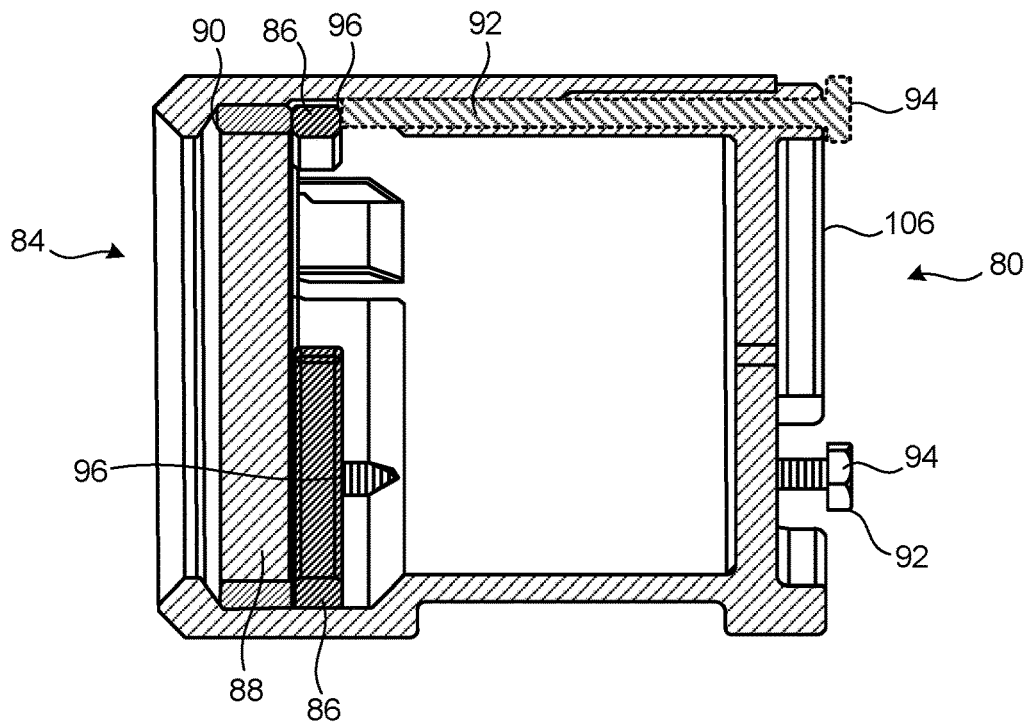
FIG. 5 shows another cross-sectional view of the universal thread protector of the preferred embodiment of the present invention.

FIG. 5 shows another cross-sectional view of the universal thread protector 80 without the pipe 26. In FIG. 5, it can be seen how the ring member 86 takes the form of a C-ring.

Similarly, the rubber element 88 is shown as being either a C-ring or an O-ring which abuts the actuating taper 90.

As can be seen in FIG. 5, the distal end 96 of the bolt 92 is shown as pushing against the ring member 86. In the preferred embodiment of the present invention, there are three bolts 92 radially disposed on the cap 82. The ring member 86, when contacted by the distal ends 96 of the various bolts 92, serves to evenly distribute the force from the bolts to the rubber element 86 so as to create a more uniform deformation or movement of the rubber element 88.

Figure 6:
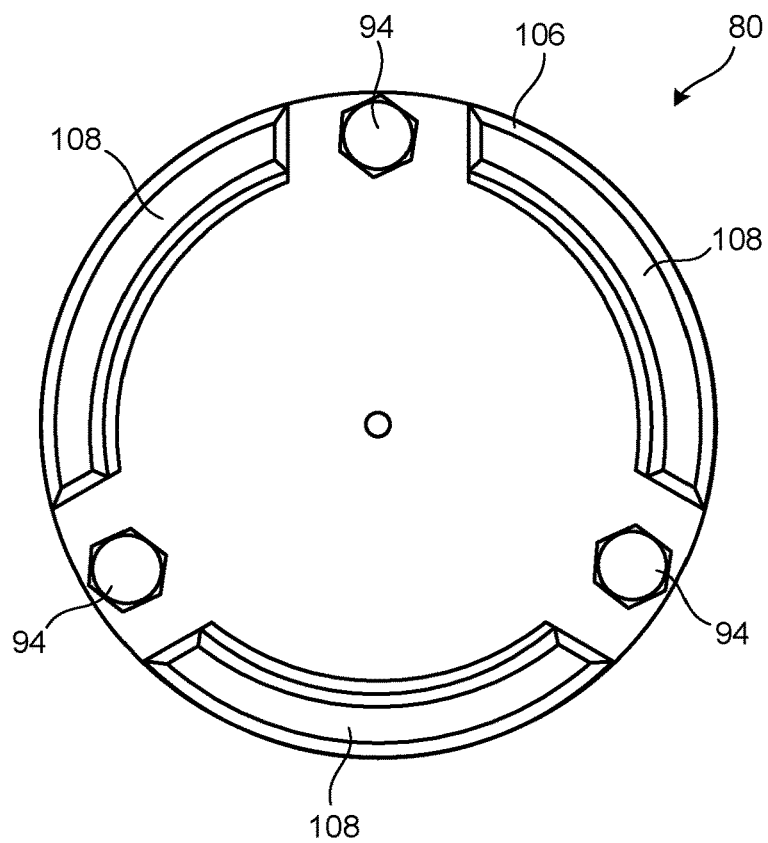
FIG. 6 shows a view of the closed end of the cap of the universal thread protector of the preferred embodiment of the present invention.

FIG. 6 shows an isolated view of the closed end 106 of the universal thread protector 80. As can be seen in FIG. 6, the bolt heads 94 and bolts 92 are radially disposed along the perimeter of the closed end 106 of the thread protector 80. FIG. 6 also shows the raised portions 108 extending along the perimeter of the closed-end 106. These raised portions only partially extend around the perimeter of the closed-end, with cutouts provided for the placement of the bolts 92.

Figure 7:
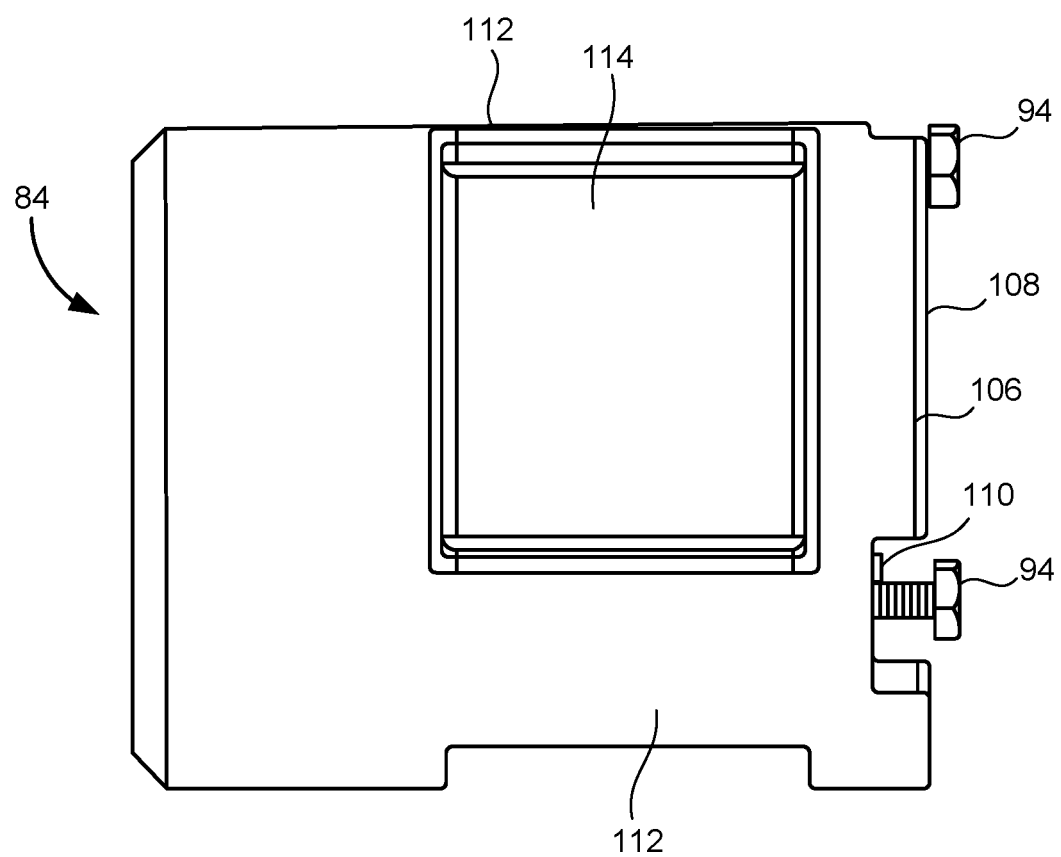
FIG. 7 shows an exterior side view of the universal thread protector of the preferred embodiment of the present invention.

FIG. 7 shows a side view of the universal thread protector 80 of the preferred embodiment of the present invention. In FIG. 7, it can be seen how the bolts 92 are threaded through optional nuts 110 positioned on the closed end 106 of the thread protector 80. It can also be seen how the raised portions 108 would protect the bolt heads 94 from accidental contact when the bolts 92 have been moved to the actuated or set position. In the actuated position, the bolt heads 94 would be flush with or situated below the surface of the raised portions 108. As such, these bolt heads would be unlikely to catch on anything such as a workers clothing.

FIG. 7 also shows a plurality of ribs 112 disposed along the cap 82 in correspondence with the position of the bolts 92. Corresponding recessed portions 114 are formed between the ribs 112. These recessed portions 114 can aid in handling, installation and removal of the universal thread protector 80.

A method disclosed the present invention involves the use of the thread protectors as disclosed in FIGS. 2-7 and similar structures. In the method of the present invention, the threaded end of the pipe is protected by inserting the threaded end of the pipe into a cap having an open-end and a closed-end. Next, the threaded end of the pipe is positioned against the interior of the cap such that a threaded portion of the threaded end of the pipe is entirely within the cap. Next a rubber seal is deformed so as to create a seal between the cap and a treaded end of the pipe. The rubber seal element is positioned interior of the cap. The rubber seal element may be deformed by moving a bolt from an unactuated position to an actuated position, wherein the bolt applies a force against the rubber seal element when in the actuated position. A ring member may be positioned between the bolt and the rubber seal element. The bolt is preferably threadedly received in the cap.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A thread protector for protecting external threads of a pipe, the thread protector comprising:
    a cap having an open end and a closed end, said cap adapted to extend over and spaced radially from the external threads of the pipe;
    a seal element positioned within and adjacent to said open end of said cap;
    a ring member positioned against said seal element between said seal element and said closed end of said cap, said ring member being a C-ring, the C-ring having open ends adapted to allow the pipe to have an end extending outwardly beyond the C-ring; and
    at least one bolt extending through the closed end of said cap and having an end positioned against said ring member, said at least one bolt being movable from an unactuated position to an actuated position, said at least one bolt applying a force directly against said ring member when in said actuated position such that said ring member pushes against said seal element, said at least one bolt being threadedly received in a threaded passageway at the closed end of said cap and arranged in spaced radial relation to the pipe.

2. The thread protector of claim 1, said seal element being deformed when said at least one bolt is in said actuated position.

3. The thread protector of claim 1, said at least one bolt having a bolt head extending outwardly of said closed end of said cap.

4. The thread protector of claim 3, said at least one bolt comprising three radially disposed bolts.

5. The thread protector of claim 4, said cap having recessed areas on an outside thereof, said recessed areas formed between said three radially disposed bolts.

6. The thread protector of claim 1, said ring member being plastic.

7. The thread protector of claim 1, said ring member being a wedge.

8. The thread protector of claim 1, said seal element being a rubber element.

9. The thread protector of claim 1, said cap having an actuating taper formed adjacent said open end, said seal element being positioned between said actuating taper and said ring member.

10. A universal thread protector for protecting external threads of a pin end of a pipe, the pipe having a box end, the universal thread protector comprising:
    a cap having an open end and a closed end, said open end having an interior adapted to accommodate either of the pin end or the box end of the pipe;
    an actuating taper formed in said interior of said cap adjacent the open end of said cap;
    a seal element positioned against said actuating taper in said interior of said cap;
    three bolts threadedly received in said closed end of said cap, said three bolts being in spaced radial relation to the pipe and each having a first end extending outwardly of said closed end of said cap and a second end located adjacent to said seal element, said three bolts movable so as to apply a force to said seal element so as to cause a deformation of said seal element between said cap and the pipe; and
    a ring member positioned between said seal element and said second end of said three bolts, said ring member being open at opposite ends thereof such that the pipe has an end extending outwardly of said ring member, said three bolts applying a force directly onto said ring member such that said ring member deforms said seal element against said actuating taper.

11. The universal thread protector of claim 10, said ring member being a plastic C-ring.

12. The universal thread protector of claim 10, said first end of each of said three bolts having a bolt head thereon.

13. The universal thread protector of claim 12, said three bolts comprising three radially disposed bolts.

14. The universal thread protector of claim 13, said cap having recessed areas on an outside thereof, said recessed areas formed between said three radially disposed bolts.

15. The universal thread protector of claim 13, said closed end of said cap having raised portions along a perimeter thereof, the bolt heads of said three radially disposed bolts being positioned between said raised portions.

16. A method of protecting an externally threaded end of a pipe, the method comprising the steps of:
- positioning a ring member against a rubber seal element disposed adjacent an inwardly extending actuating taper formed at an open end of a cap, the cap having a closed end opposite the open end of the cap;
- inserting the externally threaded end of the pipe into the open end the cap and through the ring member;
- positioning the externally threaded end of the pipe against said closed end of said cap such that the threaded end of the pipe is entirely within the cap between the open end and closed end of the cap; and
- deforming a rubber seal element by threading at least one bolt through the closed end of the cap such that an end of the bolt bears against the ring member so as to compress the rubber seal element against the actuating taper so as to create a seal between said cap and the externally threaded end of the pipe, the at least one bolt being in spaced radial relation to the pipe.

\* \* \* \* \*